UNITED STATES PATENT OFFICE.

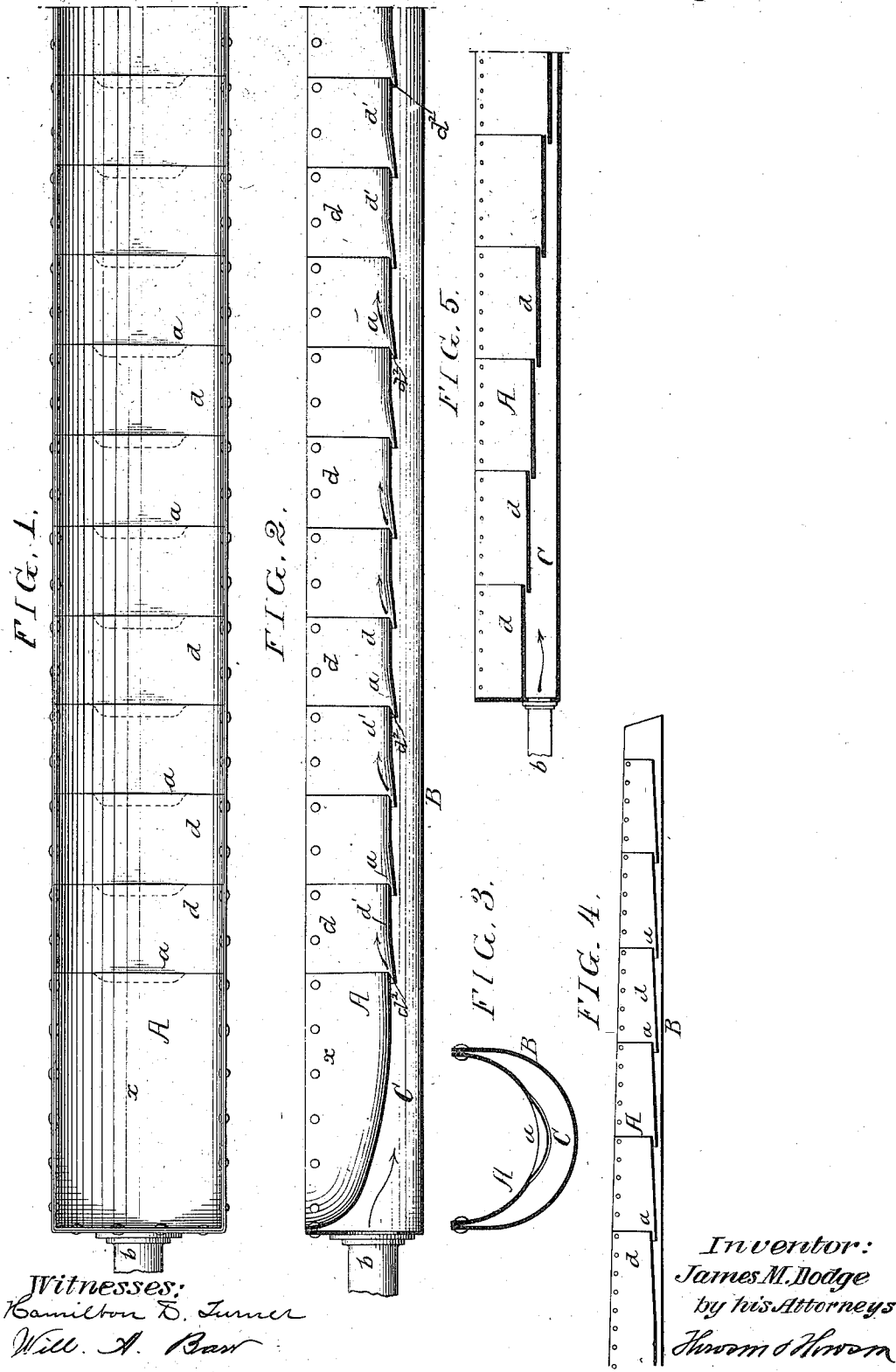

JAMES M. DODGE, OF PHILADELPHIA, PENNSYLVANIA.

AIR-BLAST CONVEYER.

SPECIFICATION forming part of Letters Patent No. 544,969, dated August 20, 1895.

Application filed February 28, 1895. Serial No. 540,002. (No model.)

*To all whom it may concern:*

Be it known that I, JAMES M. DODGE, a citizen of the United States, residing in Philadelphia, Pennsylvania, have invented certain Improvements in Air-Blast Conveyers, of which the following is a specification.

My invention relates to certain details of construction of apparatus described in the application filed by me on the 26th day of June, 1895, Serial No. 554,118.

The object of my invention is to so construct a conveyer-trough of a series of sections that one section will overlap the other, forming an inclined passage for the escape of the air or other fluid.

In the accompanying drawings, Figure 1 is a plan view of my improved conveyer-trough. Fig. 2 is a longitudinal sectional view on the line 2 2, Fig. 1. Fig. 3 is a transverse sectional view. Figs. 4 and 5 are views of modifications of my invention.

In the drawings I have shown the trough or bed arranged on a horizontal plane; but it will be understood that it may be arranged at any angle desired without departing from my invention.

A is the conveyer trough or bed, preferably shaped as shown in Figs. 1, 2, and 3, and connected to the casing B, between which and the trough is formed an air-blast C.

The trough A has a series of slots or perforations $a$ throughout its length, and the edges of the plates forming the slots overlap, as shown in Fig. 2, leaving an inclined passage for the air or other fluid, so that air forced into the conductor C in the direction of the arrow will escape through the slots, as indicated, so that material fed to the trough will be lifted or buoyed to a certain extent and carried forward in the direction of the arrow by the impact of air or other fluid, which freely escapes through the slots in the bottom of the bed.

In Figs. 1 and 2 the trough A is formed of a series of abutting plates $d$ $d$, each plate having a flat surface $d'$ and a beveled surface $d^2$. This beveled surface extends under the flat surface of an adjoining plate, as clearly shown in Fig. 2, and the plates are so spaced as to form air-passages $a$. By this arrangement the bottom of the conveyer-trough is practically level.

In Fig. 4 I have shown straight plates set at a slight angle to give the necessary overlap, and in Fig. 5 I have shown the plates stepped one slightly above the other, and in this figure the air-passage C under the trough is tapered, being larger at the inlet end than at the opposite end of the conveyer.

It will be understood that the conveyer can be shaped in any manner desired, according to the use for which it is intended, as in some instances the trough may be curved and the slots or perforations may be at one side instead of at the center and the slots may be in two or more rows without departing from my invention.

The pipe $b$ may be connected to any suitable air-blast apparatus or accumulator.

By this invention such material as ashes or hard rock can be conveyed without undue wear of the bottom of the trough, and my invention is also especially applicable in conveying material in places not accessible with the ordinary mechanical flight-conveyer.

I claim as my invention—

1. The combination in a conveyer, of a bed formed of a series of plates each plate having a portion extending under a portion of the adjoining plate and forming a passage for the fluid, with a fluid conductor connected to the bed and communicating with the said passage, substantially as described.

2. The combination in a conveyer, of a series of plates, each plate having a flat surface and a beveled surface, the beveled surface of one plate extending under the flat surface of the adjoining plate forming inclined passages, with a conductor for fluid under pressure, said conductor communicating with the passages between the plates so that the material will be impelled by the impact of fluid which freely escapes from the openings in the bottom of the bed, substantially as described.

In testimony whereof I have signed my name to this specification in the presence of two subscribing witnesses.

JAMES M. DODGE.

Witnesses:
  WILL A. BARR,
  JOSEPH H. KLEIN.